May 6, 1958
J. B. COLLINS
2,833,430
VEHICLE TOWING APPARATUS
Filed Aug. 16, 1955
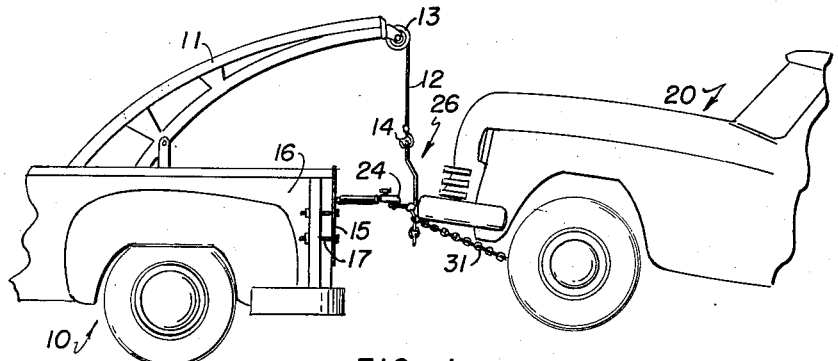
FIG. 1.
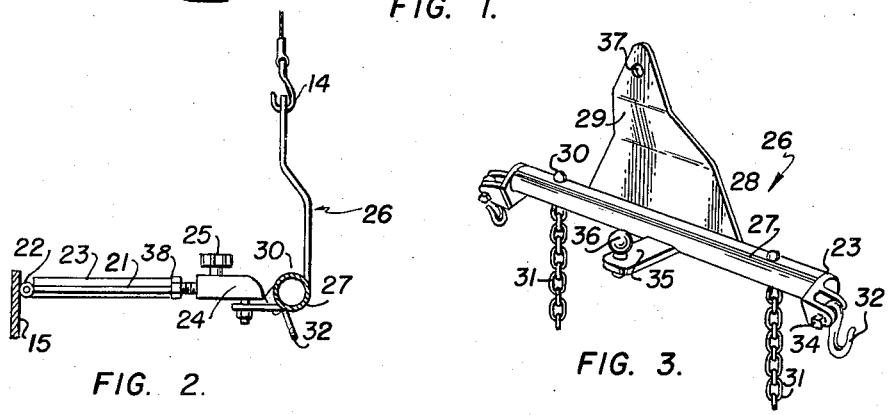
FIG. 2.
FIG. 3.
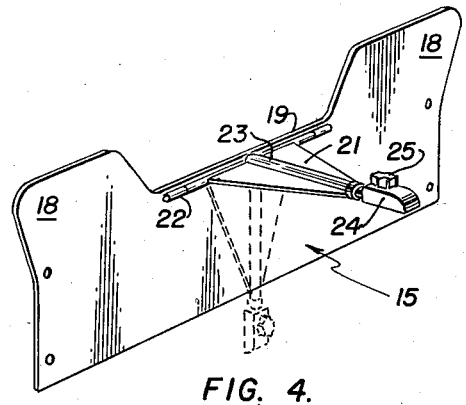
FIG. 4.
JOSEPH B. COLLINS
INVENTOR.
BY *Herbert J. Brown*
ATTORNEY

United States Patent Office 2,833,430
Patented May 6, 1958

2,833,430

VEHICLE TOWING APPARATUS

Joseph B. Collins, Fort Worth, Tex.

Application August 16, 1955, Serial No. 528,695

2 Claims. (Cl. 214—86)

This invention relates to automobile towing devices and has reference to apparatus for transporting damaged vehicles to garages for repairs.

For various economical reasons, the use of pickup trucks is often expedient in the towing of disabled vehicles. Being generally less sturdy in construction than vehicles specifically designed and constructed for this purpose, pickup trucks have, heretofore, been subject to exterior damage and to structural stresses when used for towing purposes. Particularly vulnerable to damage is the relatively light guage metal parts at the rear of a pickup truck and the body frame which may be warped by lateral tilting of a conventionally towed vehicle.

An object of the invention is to provide a relatively inexpensive construction for a towing device of the described purpose.

A particular object of the invention is to provide automobile towing apparatus adapted to be mounted on the rear end of a pickup type truck, and which apparatus is constructed and arranged to prevent damage to the truck body.

A principal object of the invention is to provide apparatus which permits independent lateral tilting of a towed or towing vehicle without subjecting either of those vehicles to damaging strains.

A further object of the invention is to provide apparatus of the described class which may be inspected at all times from the cab of the tow truck, and particularly during the towing operation.

Another object of the invention is to provide a towing apparatus capable of being quickly applied to a damaged vehicle so as to reduce the time during which the latter will block traffic.

An important object of the invention is to provide a towing device capable of transporting vehicles with twisted frames while avoiding lateral stresses in the towing device.

A further object of the invention is to provide an apparatus for the described purpose which is so simple to operate that an inexperienced person may quickly attach the same to the damaged vehicle and elevate one end of the latter to the proper position for towing without dragging the bumper on the opposite end of the disabled vehicle.

These and other objects will become apparent from the following description and the accompanying drawing, wherein:

Figure 1 is a side elevation of the rear end of a tow truck showing apparatus embodying the features of the invention mounted thereon and connected with one end of a damaged vehicle.

Figure 2 is an enlarged side elevation of the elevator assembly comprising a part of the invention and showing the projecting end of the spacer plate pivotally connected therewith.

Figure 3 is a perspective view of the elevator assembly comprising a part of the invention.

Figure 4 is a perspective view of the transverse tie member and the spacer plate in pivotal attachment in accordance with the invention.

The invention is particularly adapted for use on the rear end of a relatively small pickup type truck 10 having a tow crane 11 mounted thereon in the usual manner, and which crane includes a cable 12 positioned over a pulley 13 located rearwardly and above the rear of the truck, together with a hook 14 on the outer end of the cable.

A feature of the invention resides in a transverse tie member 15 in the form of a substantially rectangular vertically positioned plate which is rigidly secured to the rear ends of the truck body sides 16 by means of bolts 17. Preferably, the lower edge of the plate 15 is spaced from the bed of the truck 10 to facilitate sweeping or cleaning the latter. The usual tail gate, not shown, is removed before the tie member 15 is secured in place. Upwardly and outwardly directed wings 18 are integral with the upper corners of the tie member 15 and generally conform with the contour formed by the ends of the truck body sides 16. The upper edge 19 of the tie member 15 is lower than the upper edges of the truck body sides 16 and provides means whereby the operator in the cab of the tow truck may conveniently inspect the apparatus so as to be sure that the same is in working order while the damaged vehicle 20 is being towed. There is a triangular spacer plate 21 hinged along one side thereof to the upper edge of the tie member 15 by means of hinges 22, and which spacer plate is arranged for pivotal movement about a horizontal axis and adapted to extend rearwardly of the truck 10. A tubular reinforcing member 23 is centrally attached, as by welding, to the triangular spacer plate 21 and extends rearwardly from the hinge 22 through the apex of the triangular spacer plate. A conventional socket hitch 24 which can be expanded or contracted by a control knob 25 is attached to the extending end of the reinforcing member 23.

An elevator assembly 26 comprises a part of the present apparatus and includes a horizontal tubular member or carrier bar 27 having an upwardly directed carrier plate 28 secured, as by welding, to the rear center portion thereof. The carrier plate 28 is substantially triangular in shape with the base thereof attached to the carrier bar 27 and with a central portion 29 thereof forwardly and upwardly inclined so that the apex of the carrier plate is disposed above and forward of the base. Eye bolts 30 are vertically attached through the carrier bar 27 near each end thereof with their eye loops projecting from the underside of the carrier bar. Hookup chains are connected to the loops of the eye bolts 30 for attaching the elevator assembly 26 to one end of the vehicle 20 to be towed. Any convenient means of attaching the chains 31 to the vehicle 20 may be employed, and since this operation is well known to the art, it is not included in detail. Pivoted hooks 32 are mounted on brackets 33 provided at each end of the carrier bar 27 by bolts 34; these hooks provide a convenient and dependable means for reattaching the chains 31 to the carrier bar 27 as, for instance, when the chains are looped about the axle of the damaged car 20. A hitch plate 35 is centrally attached, as by welding, to the lower portion of the carrier bar and projects forwardly therefrom. A ball hitch 36, adapted to be engaged by the adjustable socket 24, is attached to the forwardly extending end of the hitch plate 35 and is positioned above the upper surface thereof. A hole 37 is provided near the apex of the carrier plate 28 for engagement with the hook 14.

The tubular reinforcing member 23 is provided with internal threads for receiving an extension of the hitch 24 so that the hitch may be rotatably adjusted on the reinforcing member and adjustably spaced from the rear of the truck 10. A lock nut 38 is provided to secure the hitch in its desired adjustment.

In operation, the elevator assembly 27 is secured to one end of the vehicle 20 to be towed. The hook 14 on the end of the crane cable 12 is then positioned through the hole 37 in the upper end of the carrier plate 28, and the crane 11 is then operated to raise the carrier bar 27 to a position level with the upper horizontal edge 19 of the tie member 15. The spacer plate 21 is then raised to a horizontal position, and the socket 24 is then secured by the adjustment knob 25 about the ball hitch 36. Thus attached and elevated for towing, the damaged vehicle 20 may be transported for repairs. The height of the hinges 22 on the tie member 15 with respect to the ground is such that when the spacer plate 21 is in a horizontal disposition the bumper, not shown, on the end of the vehicle 20 opposite its raised end will not drag the ground. The forwardly and upwardly inclined portion 29 of the carrier plate 28 provides clearance to accommodate projecting parts on the front of the towed vehicle such as hood ornaments, grill ornaments, or the like. The attachment of the carrier bar 27 to the spacer plate 21 by ball 36 and socket 24 permits the damaged automobile 20 to be transported over irregular surfaces and allows lateral tilting of the towed vehicle without strain upon the towing truck or the attached towing device. By reason of the described construction of the transverse tie member 15 across the pickup body sides 16, the latter are rigidly secured to each other so as to prevent distortion of the same. Additionally, the transverse tie member 15 protects the rear end of the pickup truck in the event that the spacer plate 21 becomes disconnected from the carrier bar 27.

The invention is not limited to the exemplary construction herein shown and described, but may be made in various ways within the scope of the appended claims.

What is claimed is:

1. In vehicle towing apparatus for use in combination with a crane equipped tow truck including rearwardly extending body sides and having a crane operated depending hook extending rearwardly of said body sides, said apparatus comprising a substantially rectangular tie member horizontally secured across the extending ends of said truck body sides, a triangular spacer plate hingedly secured along one edge thereof to the upper edge of said tie member, a carrier bar having means adapted to be connected with one end of the vehicle to be towed, a triangular carrier plate extending upwardly from the center portion of the rear side of said carrier bar, a hitch plate connected to the center portion of the underside of said carrier bar and extending forwardly thereof, the central portion of said carrier plate being inclined upwardly of said carrier bar and forwardly of said vehicle to be towed so that the upper portion of said carrier plate is disposed above and forward of the lower portion of said carrier plate, a ball end socket hitch comprising a hitch ball element connected to the forward portion of said hitch plate and positioned thereabove and a hitch socket element connected to the extending portion of said spacer plate, and means detachably retaining said ball within said socket.

2. In vehicle towing apparatus for use in combination with a crane equipped tow truck of the pick-up type, including rearwardly extending truck bed sides and having a crane operated depending hook extending rearwardly of said body sides, said apparatus comprising a substantially rectangular tie member which extends across the end of said bed and bridges the ends of said sides and is secured thereto, replacing the end gate of said pick-up truck, said tie member having an upper central portion of lesser height than its end portions, a triangular spacer plate hingedly secured along the upper edge of said central portion, a carrier bar having means adapted to be connected with one end of the vehicle to be towed, a triangular carrier plate extending upwardly from the center portion of the rear side of said carrier bar, a hitch plate connected to the center portion of the under side of said carrier bar and extending forwardly thereof, the central portion of said carrier plate being inclined upwardly of said carrier bar and forwardly of said vehicle to be towed so that the upper portion of said carrier plate is disposed above and forward of the lower portion of said carrier plate, a ball and socket hitch comprising a hitch ball element connected to the forward portion of said hitch plate and positioned thereabove and a hitch socket element connected to the extending portion of said spacer plate, and means detachably retaining said ball within said socket.

References Cited in the file of this patent

UNITED STATES PATENTS

| | | |
|---|---|---|
| 2,283,443 | Klein | May 19, 1942 |
| 2,491,357 | Ashton | Dec. 13, 1949 |
| 2,497,379 | Vandergrift | Feb. 14, 1950 |
| 2,555,663 | Schouboe | June 5, 1951 |
| 2,582,153 | Ostrander | Jan. 8, 1952 |
| 2,700,481 | Donatelli | Jan. 25, 1955 |
| 2,712,877 | Wiley | July 12, 1955 |